Nov. 30, 1965 F. SAMOUR 3,220,936
REFLUX CONDENSER WITH ADJUSTABLE REFLUX HEAD
Filed Oct. 23, 1961 2 Sheets-Sheet 1
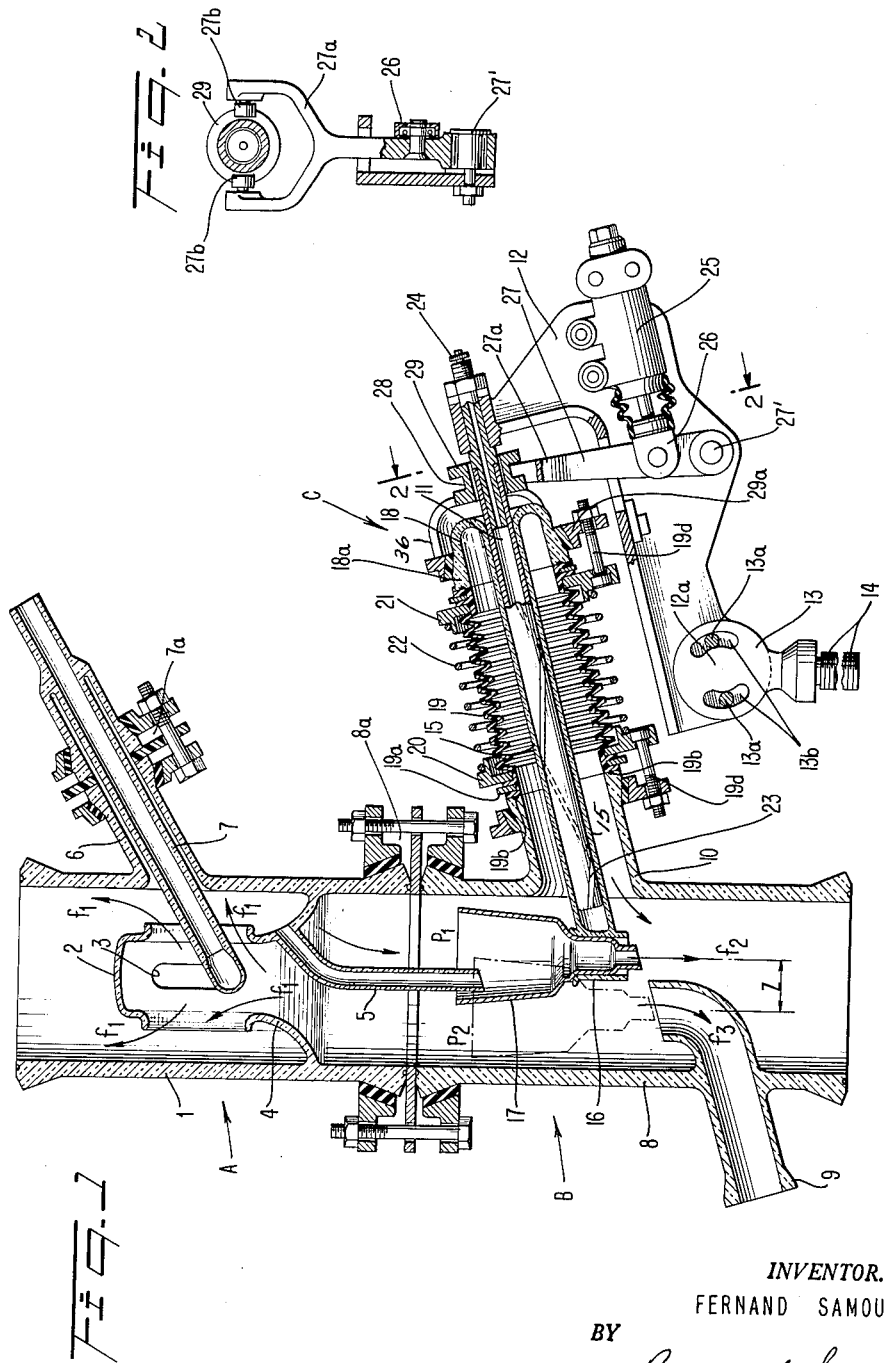
INVENTOR.
FERNAND SAMOUR
BY
*Bauer and Seymour*
ATTORNEYS

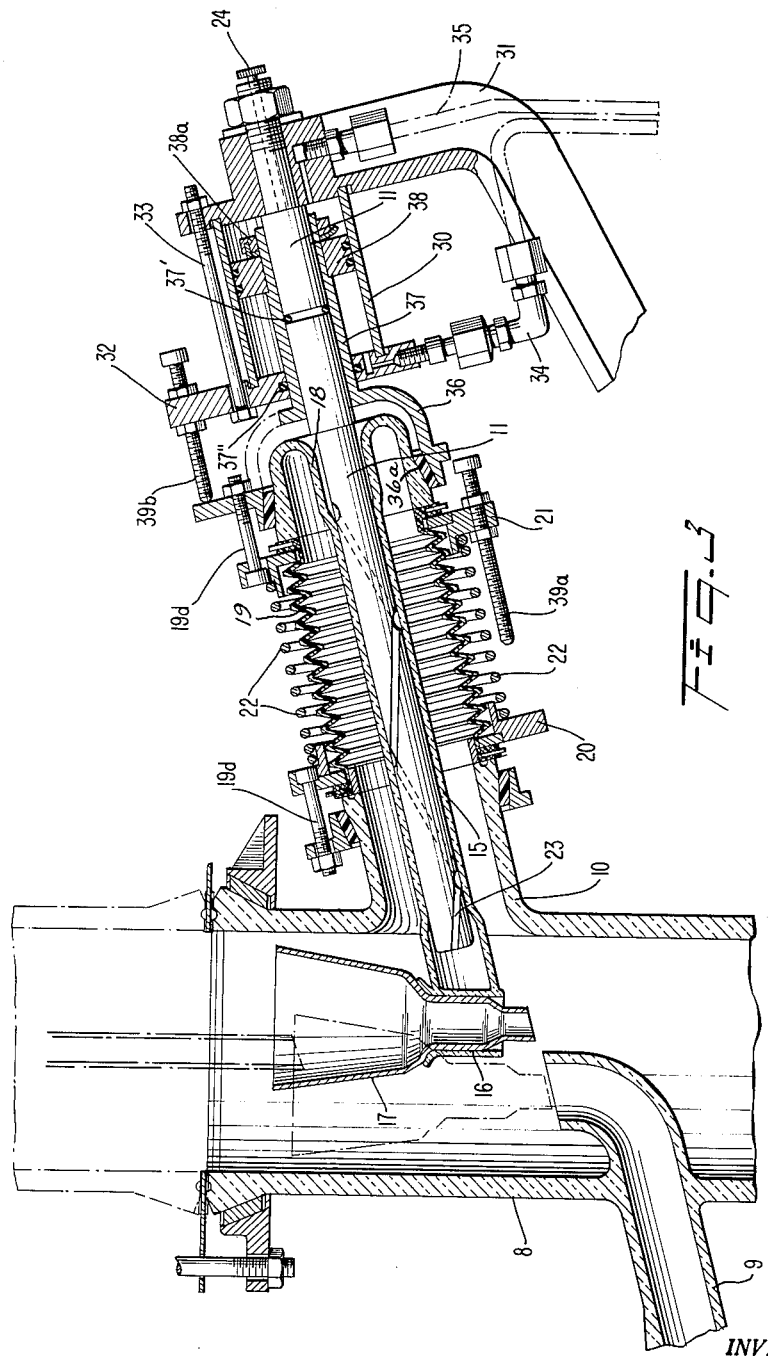

3,220,936
REFLUX CONDENSER WITH ADJUSTABLE
REFLUX HEAD
Fernand Samour, Bagneaux-sur-Loing, France, assignor to
Societe des Verreries Industrielles Reunies du Loing
Filed Oct. 23, 1961, Ser. No. 146,810
Claims priority, application France, June 30, 1961,
842,817
15 Claims. (Cl. 202—161)

This invention relates to an apparatus called distillation head which constitutes in effect a method of controlling the flow of gases and condensate in condensers, particularly, between the still portion and the condenser portion of a reflux condenser. It is in this use that the invention will be described.

It is known that the distillation columns used in the chemical industry consist essentially of a vertical column connected at its base to a still and at its upper end to a condenser, and that, in the zone of fractionation, an ascending current of gas and a descending current of liquid meet. These two currents exchange, continuously, materials and heat, and a volatile product constituting the distillate and a heavy product constituting the residue are produced.

The distillation columns of the prior art include, besides, an apparatus called a reflux head, which is placed above the zone of fractionation and under the condenser and which is designed to receive the condensate and direct it either toward the receptacles for products withdrawn from the process, or during refluxing conditions, back to the fractionating zone. The flow of condensate recovered in the reflux head is therefore equal to the sum of the refluxed flow returning to the fractionation zone and the collected flow.

The reflux ratio which is defined by the ratio:

Refluxed flow/Collected flow depends, in each particular case, on a certain number of technical, physical and chemical factors and must therefore be capable of being changed rapidly and accurately at the will of the operator. The regulation of the reflux ratio is generally attained manually by the operator charged with supervising the progress of the distillation.

The reflux heads used in these cases are essentailly composed of a gas diffuser which permits the ascent of vapors, and by a trough which receives the descending condensate and which usually includes two discharge pipes, one directed toward the fractionation column and the other toward the receptacles for discharge.

The distribution of the condensate in either direction is accomplished manually and this presents an inconvenience of considerable magnitude which has led to the production of various apparatuses for automatically controlling this distribution, during the course of the distillation in accordance with the appropriate flow schedules. Some of these apparatuses are characterized by the fact that a movable element receives the reflux condensate and discharges said condensate to different positions according to the position imposed by a solenoid outside the column. This mobile element is of glass provided with a soft iron ring and is mounted either for oscillation in a vertical plane or to be pivoted in a horizontal plane.

It is evident that a major inconvenience of this kind of apparatus resides in the great fragility of the glass elements which are the more vulnerable as their shapes are complex and as they move horizontally or vertically in an enclosure where the temperatures may exceed 100° C. in the presence of corrosive fluids of different viscosity. It is a particular difficulty with such apparatus that said elements must be made by hand by highly skilled personnel.

Another important inconvenience occurs in the use of an electrical apparatus in the near approach of the working column because of the rapid corrosion of the electrical apparatus and because of the risks of fire and explosion.

Other prior art apparatuses which control conditions of reflux are characterized by the use of an inclined polytetrafluoroethylene valve which is able, according to the position which it is compelled to take by a solenoid outside the column, either to completely close the discharge orifice, thus directing the condensate toward the inside of the fractionation column, or to allow the condensate to flow directly out of the discharge channel placed beneath the valve. Such apparatuses are largely free from the charge of fragility, but they have the imperfection of using an electrical apparatus and of demanding an excessively exact construction and great precision in the adjustment of the parts.

It is an object of the present invention to prepare a reflux head capable of automatic or manual operation, made of glass which has none of the imperfections hereinabove recited, which is at all times machine operated by fluid pressure, which is precise in operation, provides for the ready substitution of parts, which has its operating mechanism outside the apparatus, and does not require the use of electricity in the vicinity of the distillation head. Furthermore, it avoids the use of valves inside the columns.

The objects of the invention are accomplished, generally speaking, by means to control the flow of condensate in a reflux condenser comprising means to gather the condensate, a plurality of means adapted to receive the condensate, movable conduit means adapted to connect the gathering means selectively to the said plurality of means, and fluid pressure means to move the said conduit means to deliver the condensate to a selected one of the said plurality of means.

The preferred form of the apparatus has a movable conduit in the shape of a funnel which receives the condensate from the trough and directs it either to the fractionating column or to the conduit of discharge according to its position. The distribution conduit is funnel shaped and connected to the end of a glass tube, mounted about a metal rod on which it slides with slight friction and passing through a tubular opening in the wall of the reflux head at a convenient height. The tubular opening is closed against surrounding air and the escape of gases from within by a bellows of polytetrafluoroethylene or equivalent flexible material, sealed at one of its ends to the glass tube and at the other to a glass ring encircling the tubular opening in the wall of the head, thus permitting the glass tube to be reciprocated on the metal rod by a fluid operated motor.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical sectional view through a distillation head embodying the principles of the invention, FIG. 2 is a detail on the line 2—2 of FIG. 1, FIG. 3 is a vertical sectional view through a modified form of the invention, For simplicity of description and choice of language the apparatus of the invention as a whole is called the distillation head, part A is called the reflux head, the part B is called the distributor, and the part C is called the control. The reflux head A is located in the distillation column, immediately below the condenser, not shown, and includes a tube or column 1 which is frequently made of glass of resistant type, to the interior of which is connected a diffuser 2 which includes a cap which deflects condensate into the circular trough 4 and is provided with apertures 3 which allow the upward flow of gases, as indicated by the arrows $f_1$. A discharge tube or pipe 5 conducts the condensate from the trough 4 to a central position in the head. A tubular extension 6 on the body of the head receives a thermometer 7, or the like, which projects into the gas diffuser 2. The tight joints 7a seal the end of tube 6.

The distributor B is also made of heat and chemically resistant glass. Distributor B has a tubular body 8 of same diameter as the reflux head 1 and has an inclined tubular projection or outlet tube 9, which projects through the wall of body 8 and serves as a discharge tube when the reflux is to be directed to external receptacles. As shown, the upwardly-facing inlet orifice of outlet tube 9 is offset downwardly and laterally of pipe 5. A second tube 10 projects outwardly from and through the wall of body 8 at a position diametrically opposed to tube 9 and has its axis somewhat above that of tube 9 in the same vertical plane and inclined in the same degree. This tube supports the control unit C. The control unit is organized around a metallic guide rod 11 fixedly supported in aligned relation with the axis of tube 10 by a bracket 12 which is mounted so as to be turned in three directions. In the form of the invention illustrated in FIG. 1, the bracket 12 is mounted for angular adjustment upon a fork 12a which is mounted on the head 13 of a screw 14. Abutments 13a mounted in bracket 12 enter slots 13b in the head 13 and limit the motion of the bracket 12. This alignment can be accomplished mechanically, for example by the use of a gear sector and a screw. The screw 14 is itself capable of adjustment vertically and angularly by means of lock nuts or the like.

A tubular funnel holder 15 which may be of heat-resistant glass, has a guided fit on and about rod 11 for translation along the rod. The tube of this funnel holder is internally calibrated and there is attached to it at its extremity within the column, a cylindrical ring 16 having a flared collar to detachably receive a funnel 17. At its outer end the tube is outwardly and reversely flared to form a skirt 18a which may have a diameter equal to that of tube 10.

A cylindrical bellows 19 made of polytetrafluoroethylene or some other flexible and inert material is mounted at its respective extremities by means of cylindrical seals on skirt 18a and tube 10. This cylindrical sealing can be accomplished by means of gaskets 19b and appropriate bolts 19d. A compression spring 22 extends between the flanges 20, 21 of rings which are mounted on the ends of the bellows. The supporting rod 11 has on its surface spiral grooves 23 which communicate with a central canal which opens at a grease fitting 24, assuring the easy adjustment of the holder 15 on and along rod 11.

The distribution control means, which are represented on FIGS. 1 and 2, include a recessed cylinder and piston 25 fixed on bracket 12. Such cylinder and piston operates under fluid pressure in the usual way to move the piston rod 26 in or out as desired. Rod 26 is articulated to a lever 27 which is pivoted at 27′ on the bracket 12; lever 27 is forked at 27a, and the fork has rollers 27b disposed on oppositely directed stub shafts on the fork.

Rollers 27b are received in circular channel 28 of collar 29. This collar slides on and along rod 11 and is fixedly connected with skirt 18a by means of a spider 36.

The impulses received by the recessed cylinder 25 from a main cylinder (not shown) are transmitted to the funnel holder 15 by means of forked lever 27, rollers 27b, ring 29 and spider 36. Accordingly a translatory motion transversely of the column is imparted to the funnel holder 15 and funnel 17. The funnel is thus adjustable between a position $P_1$ in which the condensate flowing from tube 5 is discharged in the fractionating column according to arrow $f_2$ and a position $P_2$ in which the condensate flowing from the tube 5 is discharged, according to arrow $f_3$, in the mouth inlet orifice of tube 9 leading the distillation product to a balloon flask (not shown).

When the cylinder 25 is deenergized, the spring 22 which was compressed, expands and restores the funnel holder 15 to its initial position $P_1$.

When the device is being operated automatically to discharge the reflux periodically, the timing mechanism which operates the valve will activate the cylinder 25 and the mechanism to move the funnel over the tube 9 for the length of time required by the schedule, whereupon the pressure will be released and the spring 22 will return the funnel to the position $P_1$ indicated in solid lines for further refluxing of the condensate.

In FIG. 3 there is illustrated a modification of the invention in which the control of the distributor is pneumatic. A central cylinder 30 is clamped by bolts 33 concentrically of rod 11 between a support 31, similar to bracket 12 of FIG. 1, and a ring 32 mounted on support 31. The cylinder 30 differs from that of FIG. 1 in being valved for two-way operation whereas that of FIG. 1 operates normally in the open position of the bellows, being compressed only during the periods of discharge. The cylinder 30 receives air from pipes 34, 35 which are connected to an appropriate valve, not shown. The spider 36 comprises a tubular shaft 37, serving as a piston rod, which slides on shaft 11; sealing is accomplished by two O-ring seals 37′ and 37″ between ring 32 and shaft 37 and between shaft 37 and rod 11, respectively. A piston 38 is fixed by screws 38a on the shaft 37. The adjustable stops 39a, 39b are mounted respectively on parts 32 and 21 and serve to limit the travel of the tubular support 15, thus establishing the terminal positions of the funnel shown in full and phantom lines. Spider 36 has arms integral with and extending from the inner end of shaft 37 and terminates in a ring surrounding skirt 18a and connected therewith through an annular ring 36a.

This apparatus is particularly well adapted to automatic operation by means of timing apparatus of known type which operates the control valves, not shown, which deliver the fluid pressure to one side or the other of the pistons as required by the established time schedule. Such mechanisms may be hydroelectric, the electrical parts being remote from the apparatus, when pressure is hydraulic or electro-pneumatic in the case of the apparatus of FIG. 3.

The apparatus is believed to be superior to any which have heretofore been provided for this use. It is at all times under positive control. Fragile parts are protected. Practically speaking, the only parts inside the column are a glass funnel mounted for ready removal and a glass ring. If the funnel breaks it is immediately replaceable. The control apparatus is outside the column and is subject to repair without disturbing the column. For example, to repair the apparatus of FIGURE 3, removal of the outer bolts 19d enables bracket 31 and all parts carried thereby, including rod 11 to be removed as a unit. The same is true for the mechanism of FIG. 1. The column remains sealed by the tube 15 and bellows 19, the latter being held in position by the spring 22.

The invention produces a reflux head particularly adapted to the automatic distribution of a condensate within a still or rectifier of which the distributor is constituted, by a funnel connected at the end of a glass tube capable of sliding readily on a metal rod, and which is admitted to the column through an opening under seal, the seal comprising a bellows or the like connected at one of its ends to the column and at the other to the funnel support. The funnel support is movable under the command of a fluid operated cylinder and piston and is removable from the apparatus without disturbing the sealing thereof. The invention also contemplates the placing at the extremity of the holder 15 of a ring 16 which supports the funnel 17 firmly but removably. The other end of the support 15 is shaped as a skirt which serves to mount one end of the bellows and which receives and transmits to holder 15 the forces applied by the piston. The angle at which the funnel is positioned within the column and the angle made by the funnel support with the axis of the column is adjustable; the adjustability is in three directions as desired. The power is hydraulic and all electrical controls are remote from the apparatus.

As many apparently widely different embodiments of the present invention may be made without departing from the spirit and scope thereof, it is to be understood that the invention is not limited to the specific embodiments.

What is claimed is:

1. A condenser distillation head comprising a tube, an annular trough in the tube adapted to collect condensate, a cap above the central aperture of the annular trough adapted to direct condensate to the trough and provided with openings to permit the flow of gas, heat measuring means extending into the tube and the cap, a drain pipe extending from the trough inside the tube, a discharge conduit below the drain pipe extending outside the tube, funnel means within the tube positioned to receive the flow from the drain pipe, and means to move the discharge orifice of the funnel to and away from the discharge conduit comprising a support for the funnel comprising a ring-shaped element fixed at one end of a tubular member which extends outside the tube through a second conduit opening into the side wall of the tube, and which is slidably mounted on a rod while the other end of said tubular member is flared out in a flange around which is secured a bellows located coaxially of said tubular member and secured at its other end around the mouth of said second conduit opening into the side wall of the tube, means to adjust the angle of the support relative to the axis of the tube, and means to move the support axially to change the position of the funnel comprising a fluid operated cylinder and piston.

2. Apparatus for distributing fluid to a plurality of places within a column, said apparatus comprising a first tube connected to and open to the column at one side thereof and extending outwardly therefrom, a second tube telescoped within the first tube and extending generally concentrically thereof, the second tube having a diameter which is substantially less than that of the first tube, the inner end of the second tube, nearer the column, being imperforate and the outer end of the second tube, remote from the column, being open, movable distributor means within the column connected to the inner end of the second tube, a rod extending into the inner tube from the outer end thereof and having a sliding fit with the inner tube, means supporting the rod beyond the outer end of the second tube, said last named means being adjustable angularly whereby to adjust the angularity of the second tube with respect to the first tube, a flexible sealing means connected between the first and second tubes so as to permit angular adjustment therebetween, and means connected to the second tube to move it along the rod, whereby to change the position of the distributor means.

3. Apparatus as defined in claim 2, wherein the flexible sealing means is a bellows disposed around the second tube, and sealingly connected at one end thereof to the outer end of the first tube and at the other end thereof to the second tube adjacent its outer end.

4. A distillation head comprising a normally vertical tubular column, first means fixed within said column for collecting condensate descending therein and discharging the same downwardly in a concentrated stream, an outlet tube fixed in and extending through the wall of said column, and having an upwardly-facing inlet orifice offset laterally and downwardly from the stream of condensate from said first means, a rod, support means external of said column and mounting said rod to extend through an opening in the side wall of said column, a tubular holder slidably mounted on said rod through said opening, condensate collecting means carried by said holder, within said column, to receive distillate from said first means and to discharge the same downwardly within said column, and pressure fluid operated power means carried by said support means and mechanically connected with said holder to translate the latter on and along said rod between positions wherein said condensate collecting means discharges condensate into said orifice, and past said orifice, respectively.

5. In a distillation head, a normally vertical column having a discharge conduit, first means within said column collecting liquid condensate descending therein and discharging the same downwardly in a concentrated stream, fluid pressure operated means positioned exteriorly of said column and extending through an opening in the wall thereof and connected with said first means to move the same transversely of said column between a first position discharging condensate into said discharge conduit and a second position discharging condensate downwardly past said conduit, tubular flexible bellows means around a portion of said fluid pressure operated means exteriorly of said column, a first seal between one end of said bellows means and said column, about said opening, a second seal at the other end of said bellows means, and a detachable connection between said second seal and said fluid pressure operated means.

6. A reflux device comprising a normally vertical tubular column having a central axis, first means within said column to collect condensate descending therein and to discharge the same downwardly in a concentrated stream within said column, an outlet tube passing through the wall of said column and having an upwardly-facing inlet orifice below and radially offset from a stream of condensate discharged from said first means, a second tube opening through the wall of said column, guide rod means, second means external of said column and mounting said guide rod means to extend in and along said second tube, a slide mounted on said guide rod means for guided translation thereon, funnel means carried by said slide within said column to receive condensate discharged from said first means, and fluid pressure operated means external of said column and connected with said slide to move the same and thereby said funnel means, from a first position discharging condensate into the inlet orifice of said outlet tube, to a second position directing condensate past said orifice downwardly in said column.

7. The reflux device of claim 6, and a flexible tubular bellows having one end connected with and sealing the outer end of said second tube and its other end connected with and sealed about the outer end of said slide.

8. The reflux device of claim 6, said second means mounting said guide rod means for angular movement in a plane through the central axis of said column.

9. The reflux device of claim 6, said last-named means comprising a fluid pressure power cylinder and piston, and an operating connection between said piston and slide to translate the latter on and along said guide rod means, by and in response to introduction of pressure fluid into said cylinder.

10. A distillation head comprising a conduit within a condenser tube adapted in different positions to deliver a flow of fluid to different places of discharge, a support for the conduit including a sleeve extending out through an opening in the wall of the tube, means including a rod extending into the sleeve to support the sleeve, means including a bellows to seal the space between the sleeve and said opening in the wall of the tube through which the sleeve extends, means to lubricate the rod and sleeve, means to tilt the rod, and fluid pressure means to move the sleeve along the rod to a plurality of positions whereby to change the place of discharge of the conduit from one position wherein the fluid is delivered within the condenser tube to a second position wherein the fluid is delivered to a second conduit which opens into the condenser tube and extends outwardly therefrom.

11. The apparatus of claim 10 in which the fluid pressure means includes a liquid operable cylinder and piston connected to said sleeve.

12. The apparatus of claim 10 in which the means to move the sleeve comprises a gas operated piston connected thereto.

13. A reflux splitter comprising a normally vertical tubular column, first means in said column collecting condensate descending therein and discharging the same downwardly in a concentrated stream within said column, an outlet tube passing through the wall of said column and having an upwardly-facing inlet orifice below the stream of condensate discharged from said first means, a guide rod extending through an opening in the wall of said column, at an angle to the central axis of said column, and fixedly supported at its outer end, funnel means comprising a tubular slide on and translatable along said guide rod, and a funnel removably carried by said tubular slide, said funnel being constructed and arranged to receive condensate discharged from said first means, for all positions adjustment of said slide on and along said guide rod, and power means external of said column and mechanically connected with said tubular slide, said power means being selectively energizable to effect movement of said slide along the guide rod between a first position in which said funnel directs condensate into said inlet orifice and a second position in which the funnel directs condensate past said orifice and downwardly in said column.

14. The reflux splitter of claim 13, a tubular bellows sealed at its inner end to and about said opening in the wall of said column, and at its outer end to and about said tubular slide, and spring means urging said slide radially outwardly of said column to position said funnel in said second position.

15. A condenser head comprising a normally vertical tubular column having a central first axis, drain pipe means fixed within said column to extend along said first axis, means within said column to collect condensate and discharge the same into said drain pipe means, a condensate outlet tube passing through the wall of said column and having an upwardly facing orifice within said column, and offset from and below the discharge end of said drain pipe means, a second tube opening from the wall of said column and having a second central axis angularly related to and coplanar with said first axis, a rod, means fixedly mounting said rod to extend in and along said second axis within said second tube, a tubular holder mounted on said rod for guided translation thereon along said second axis, funnel means carried by the inner end of said holder within said column and positioned to receive condensate from said drain pipe means, said funnel means being moved by and in response to translation of said tubular holder on and along said rod, between a first position directing condensate downwardly into said orifice, and a second position directing condensate past said orifice, and fluid pressure operated means external of said column and mechanically connected with said tubular holder to translate the same and thereby move said funnel means between said first and second positions.

References Cited by the Examiner
UNITED STATES PATENTS

| | | | |
|---|---|---|---|
| 876,687 | 1/1908 | Brown | 137—612 |
| 2,129,502 | 9/1938 | McCreary | 137—612 |
| 2,251,185 | 7/1941 | Carter et al. | 202—161 |
| 2,476,477 | 7/1949 | Berg | 202—161 X |
| 2,518,574 | 8/1950 | Skopecek | 137—612 |
| 2,538,957 | 1/1951 | Askevold et al. | 202—161 X |
| 2,762,761 | 9/1956 | Stanley et al. | 202—160 |
| 2,827,078 | 3/1958 | Zies | 137—612 |
| 2,903,401 | 9/1959 | Heere | 202—161 |
| 3,012,949 | 12/1961 | Mooney | 202—161 |

NORMAN YUDKOFF, *Primary Examiner.*

ALPHONSO D. SULLIVAN, *Examiner.*